United States Patent [19]

Ludwig

[11] Patent Number: 4,977,044
[45] Date of Patent: Dec. 11, 1990

[54] SODIUM-SULFUR THERMAL BATTERY

[75] Inventor: Frank A. Ludwig, Rancho Palos Verdes, Calif.

[73] Assignee: Hughes Aircraft Company, Los Angeles, Calif.

[21] Appl. No.: 416,686

[22] Filed: Oct. 3, 1989

[51] Int. Cl.⁵ .................. H01M 4/36; H01M 2/14
[52] U.S. Cl. ...................... 429/104; 429/102; 429/247
[58] Field of Search .................. 429/104, 102, 247

[56] References Cited
U.S. PATENT DOCUMENTS 4,452,871 6/1984 Bindin ........................... 429/104
4,497,742 1/1985 Haberfellner et al. ............. 429/104
4,767,685 8/1988 Mennicke et al. ................. 429/104

Primary Examiner—Anthony Skapars
Attorney, Agent, or Firm—M. E. Lachman; W. K. Denson-Low

[57] ABSTRACT

An improved sodium-sulfur thermal battery having a sodium electrode and sulfur electrode separated by a porous separator wherein the separator is sufficiently porous to allow preliminary migration of fluid sodium metal, fluid sulfur and fluid sodium polysulfides through the separator during operation of the battery in order to form a mixed polysulfides electrolyte gradient within the porous separator.

16 Claims, 2 Drawing Sheets

SODIUM-SULFUR THERMAL BATTERY

This invention was made with United States Government support under Contract No. F33615-87-C-2727 awarded by the Department of the Air Force. The U.S. Government has certain rights in this invention.

BACKGROUND OF THE INVENTION

1. Field of the Invention

The present invention relates generally to advanced technology thermal battery systems. More particularly, the present invention relates to sodium-sulfur thermal batteries for use in providing a high-power density electrical energy source.

2. Description of Related Art

The sodium-sulfur battery was first introduced in the mid 1960's Since that time, there has been a great deal of interest in developing cell designs which are suitable for a wide variety of applications. Batteries which have been under development include those for use in automobiles and train locomotives. One such battery is described by J. L. Sudworth in the publication entitled "Sodium/Sulfur Batteries for Rail Traction," in the Record the Tenth Intersociety Energy Conversion Engineering Conference, 1975, pages 616-620. Cell designs have also been investigated for producing batteries for storage of electricity for delayed use in order to level out the production rate of electricity and for space systems requiring high energy density. The sodium-sulfur battery is used as a secondary, that is, rechargeable battery. Its use as a primary (one-time discharge) battery would be unwarranted because of the cost, complexity and fragility involved in edge-sealing and incorporating a ceramic solid electrolyte into a battery design. In addition, there are other relatively inexpensive primary batteries of higher power density available in the marketplace.

The typical sodium-sulfur electrochemical cell includes a molten metallic sodium anode, a sodium ion conducting ceramic solid electrolyte and a molten sulfur electrode. The sodium-sulfur cell usually operates at a relatively high temperature (300°-400° C.) in order to maintain not only the sulfur and sodium, but also their reaction products, in a molten state. The solid electrolyte is a critical part of the cell configuration because it must also provide separation of the liquid sodium from the liquid sulfur in order to prevent catastrophic cell failure. Finding a suitable solid electrolyte has been a difficult task because of the high conductivity required for a high power density battery.

Solid electrolytes which have been used in sodium-sulfur batteries include beta''-alumina and other sodium ion conducting ceramic or glass. Beta''-alumina has become the most popular solid electrolyte. However, a problem with all of these solid electrolytes is that they suffer from relatively low conductivity and have coefficients of thermal expansion which are not well matched to other materials used in making the cell. Accordingly, the present solid separation cell configurations are fragile and are limited to relatively low power outputs. In addition, the differences in thermal expansion between the ceramic material and other cell elements make it difficult to provide a seal around the edges of the ceramic separator. Further, the differential stresses present in the sodium-sulfur cell during operation may weaken the solid electrolyte resulting in the formation of cracks or other structural failures.

In view of the above problems associated with the present solid electrolytes, there is a continuing need to develop sodium-sulfur battery configurations wherein higher levels of conductivity are achieved through the electrolyte. In addition, new separator designs are necessary which do not have thermal expansion mismatches or sensitivity to catastrophic failure. Further there is a need for a primary battery which has high power density, long shelf-life, ruggedness, and discharge times ranging from seconds to several hours.

SUMMARY OF THE INVENTION

In accordance with the present invention, a sodium-sulfur thermal battery is provided wherein a new electrode separator provides high ionic conduction while at the same time providing the necessary physical separation of the liquid sodium and sulfur electrodes.

The sodium-sulfur thermal battery in accordance with the present invention includes a sodium electrode, a sulfur electrode and a separator located between the sodium and sulfur electrodes wherein the separator has sufficient porosity to allow preliminary migration of fluid (liquid or gaseous) sodium metal and fluid (liquid or gaseous) sulfur therethrough during initial operation of the thermal battery to form a sodium polysulfide electrolyte within the separator. It is believed that the migration of sulfur and sodium into the porous separator when the cell is heated to operating temperatures for the first time produces a polysulfide gradient. This polysulfide gradient is composed of sodium sulfides having the formula $Na_2S_x$ wherein x is approximately five or less but greater than or equal to 1. The composition of the gradient is believed to be:

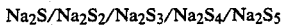

$Na_2S$ is a solid at temperatures below 1000° C. As a result, the solid $Na_2S$ provides a solid barrier which prevents migration of liquid sulfur or sodium through the entire porous separator. At the same time, the remainder of the polysulfide gradient provides levels of ionic conductivity which are not possible with the previous solid ceramic materials. As a particular feature of the present invention, the use of a porous separator in combination with a polysulfide gradient provides suitable liquid electrode separation while also providing high rates of ionic conduction and resulting high electrical power output.

As a feature of the present invention, the preferential wetting characteristics of liquid sodium and liquid sulfur are utilized in combination with the wetting characteristics of polysulfides to further enhance electrode and electrolyte separation. In accordance with this feature of the present invention, the liquid sodium electrode includes a metallic wick upon which sodium metal is preferentially wetted to promote isolation of the liquid sodium. Further, graphite fiber or other material which preferentially wets liquid sulfur is utilized at the sulfur electrode in order to further maintain separation of the liquid electrodes. In addition, the porous separator material is selected to be preferentially wet by polysulfides which provide uniformity to the electrolyte layer and increases the integrity of the cell separator against continuing sodium and sulfur fluid migration.

The above-discussed and many other features and attendant advantages of the present invention will become apparent as the invention becomes better understood by reference to the following detailed description when considered in conjunction with the accompanying drawings.

DESCRIPTION OF THE PREFERRED EMBODIMENTS

Figure 1:
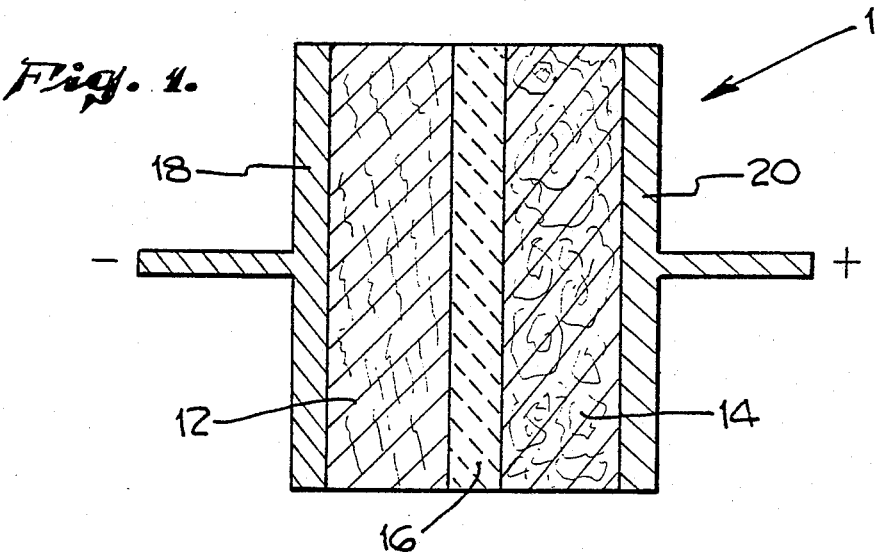
FIG. 1 is a schematic representation of an exemplary sodium-sulfur cell in accordance with the present invention.

A preferred exemplary sodium-sulfur thermal cell is shown diagrammatically in FIG. 1 at 10. The cell 10 includes a metal wick anode 12 which is impregnated with metallic sodium and a carbon graphite felt cathode 14 which is impregnated with sulfur. The anode 12 and cathode 14 are separated by a porous oxide separator 16. Current collectors 18 and 20 are provided at the anode and cathode, respectively, for allowing removal of electrical energy from the cell 10.

The material used to form the metallic wick 12 can be any of the known materials which preferentially wet sodium metal. These materials include nickel, steel, or any other suitable metallic material. The wick 12 is preferably made from nickel felt which is commercially available. The pore size and surface area of the nickel felt may be varied provided that sufficient wetting and impregnation with sodium metal is possible in order to form a suitable liquid electrode. Nickel felt marketed under the trade name Fibrex ® is available from National Standard Company, Niles, Mich. This is the preferred metallic felt material.

The wick or felt material 14 utilized to support the liquid sulfur can be any conductive fibers, powders or felt materials which are preferentially wet by molten sulfur. Commercially available graphite felts are the materials of choice in state-of-the-art sodium-sulfur battery technology. Any of the felts used in these state-of-the-art sodium-sulfur batteries are adequate for the purposes of this invention. An adequate felt is SGF available from Stackpole Corp., St. Marys, Pa.

The porous separator 16 is preferably made from a ceramic material such as silica fibers sintered into a porous mat such as is available from Lockheed Corp., Sunnyvale, Calif, as FRCI-12 or HTP-12. Other suitable porous ceramic materials include zirconia or alumina felt and paper available from Zircar Products, Inc., Florida, New York. Zircar alumina felt and paper APA-1, APA-2 and APA-3 are especially preferable. The porous material should have sufficient porosity to allow preliminary migration of fluid (liquid or gaseous) sodium metal and fluid (liquid or gaseous) sulfur therethrough during initial operation of the battery to form a polysulfide electrolyte gradient. The term "preliminary migration" is used to mean the migration which occurs upon initial operation of the cell, in order to establish the polysulfide electrolyte gradient. Once this gradient is established, there is no longer free flow of the fluids; however, diffusion through the separator still occurs. As previously mentioned, the polysulfide electrolyte is believed to be in the form of a gradient having the composition $Na_2S/Na_2S_2/Na_2S_3/Na_2S_4/Na_2S_5$ Although the thickness of the porous separator 16 may be varied according to intended use, it is preferred that the thickness of the layer or mat be between 0.01 cm to 0.3 cm. Preferably, the layer will have a thickness of about 0.01 cm to 0.06 cm.

Operation of the sodium-sulfur thermal cell shown in FIG. 1 is carried out in accordance with conventional operating procedures for sodium-sulfur batteries. Typically, this involves heating of the cell to a temperature at which the sodium metal and sulfur are both liquids. This temperature is typically between 100° C. to 400° C. depending upon the pressure within the cell.

In general, generation of electrical current will take slightly longer when the cell in accordance with the present invention is heated for the first time due to the necessity for the liquid sodium and sulfur to migrate into the porous layer 16 for reaction and formation of the polysulfide electrolyte. Alternatively, the porous separator 16 may be pre-impregnated with a polysulfide (preferably $Na_2S_3$). Pre-impregnation of the porous separator 16 provides immediate turn-on of the cell once it reaches operating temperature.

An alternative electrolyte which may be impregnated into the porous separator 16 is sodium tetrachloroaluminate. Impregnation of the porous separator with sodium tetrachloroaluminate will provide a highly conductive electrolyte with good transport properties. Sodium tetrachloroaluminate is known to wet oxides and to solubilize not only the sodium polysulfides, but also sulfur to a lesser degree. The amount of sodium tetrachloroaluminate which should be impregnated into the porous separator will vary depending upon the maximum current density desired.

It should be noted that changes in the volume of materials in the compartments defined by the sodium and sulfur electrodes will occur on discharge. This is not normally a problem in conventional thermal batteries which operate for only brief periods. However, the present electrochemical cell will have an active operating time on the order of one hour or more. Material transport within the cell will be from the sodium anode 12 to polysulfides in the cathode 14. The result will be the filling of the graphite felt in the sulfur cathode 14. The net cell reaction can be considered to be:

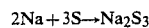

$2Na + 3S \rightarrow Na_2S_3$ $Na_2S_3$ wets graphite felt, but not in preference to the liquid sulfur. Accordingly no extra separator material nor separator structures need be used to contain discharge reaction products. There will be a net increase in the material on the cathode side 14 of separator 16 and the sodium electrode side 12 of the cell will be depleted. However, the volume of material in the compartment on the sulfur cathode side of separator 16 will increase only slightly. Allowance is made for this slight volume increase by leaving some empty cathode volume during the initial filling of the cell with sulfur.

Figure 2:
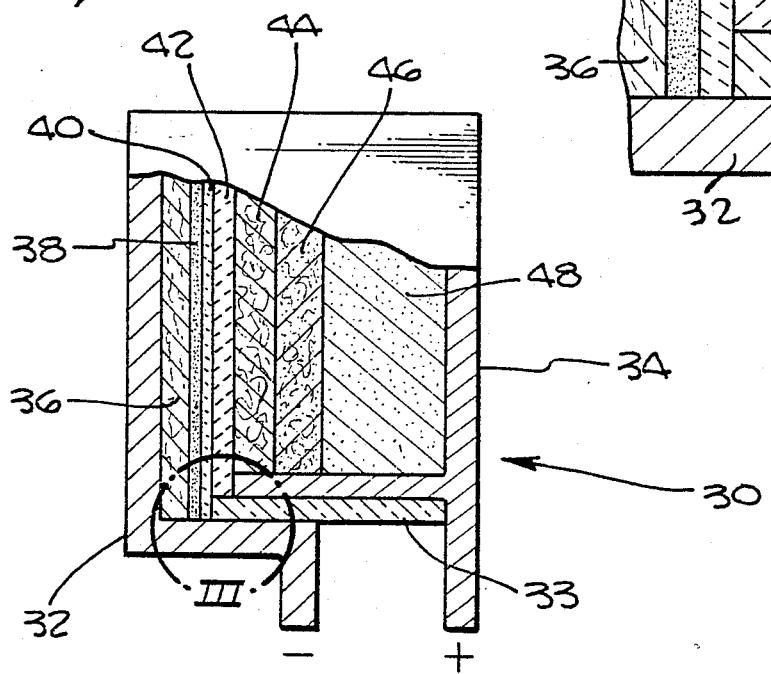
FIG. 2 is a partial sectional view of a preferred exemplary embodiment of the present invention.

An exemplary sodium-sulfur cell is shown at 30 in FIG. 2. The cell can be initially evacuated or provided with a small bleed hole in the cathode casing so that pressures in the cell are equalized at operating temperatures. The design in FIG. 2 minimizes pressure changes due to changes in the internal volume of reactant in the anode and cathode compartments during operation of the cell. Furthermore the specific design minimizes leakage of sulfur vapor around the edges of the separator layers and into the anode compartment due to any slight excess pressure in the cathode compartment. The cell 30 includes an aluminum anode current cup collector 32 and an aluminum cathode current cup collector 34. A layer of glass insulator 33 is provided to separate the collector cups. The anode is provided by a sodium impregnated metallic wick 36. A layer of sodium-impregnated aluminum powder 38 is placed between the sodium electrode 36 and the porous separator.

The porous separator includes two layers 40 and 42. Although single layer porous separators are suitable, it is preferred that the porous separator include a layer 40 which is not impregnated with polysulfide and a layer 42 which is impregnated with a polysulfide such as $Na_2S_4$. The polysulfide impregnated layer 42 is preferably thicker than the other layer 40. In addition, multiple layers of three or more can be used if desired. For example, an additional non-impregnated porous layer may be placed on the side of impregnated layer 42 opposite from layer 40.

Two layers of graphite felt 44 and 46 are used to provide the sulfur cathode. These layers 44 and 46 may be impregnated with either sulfur or $Na_2S_5$. In addition, a graphite current collector 48 provides electrical contact between the graphite layers 44, 46 and the current collector cup 34.

Figure 4:
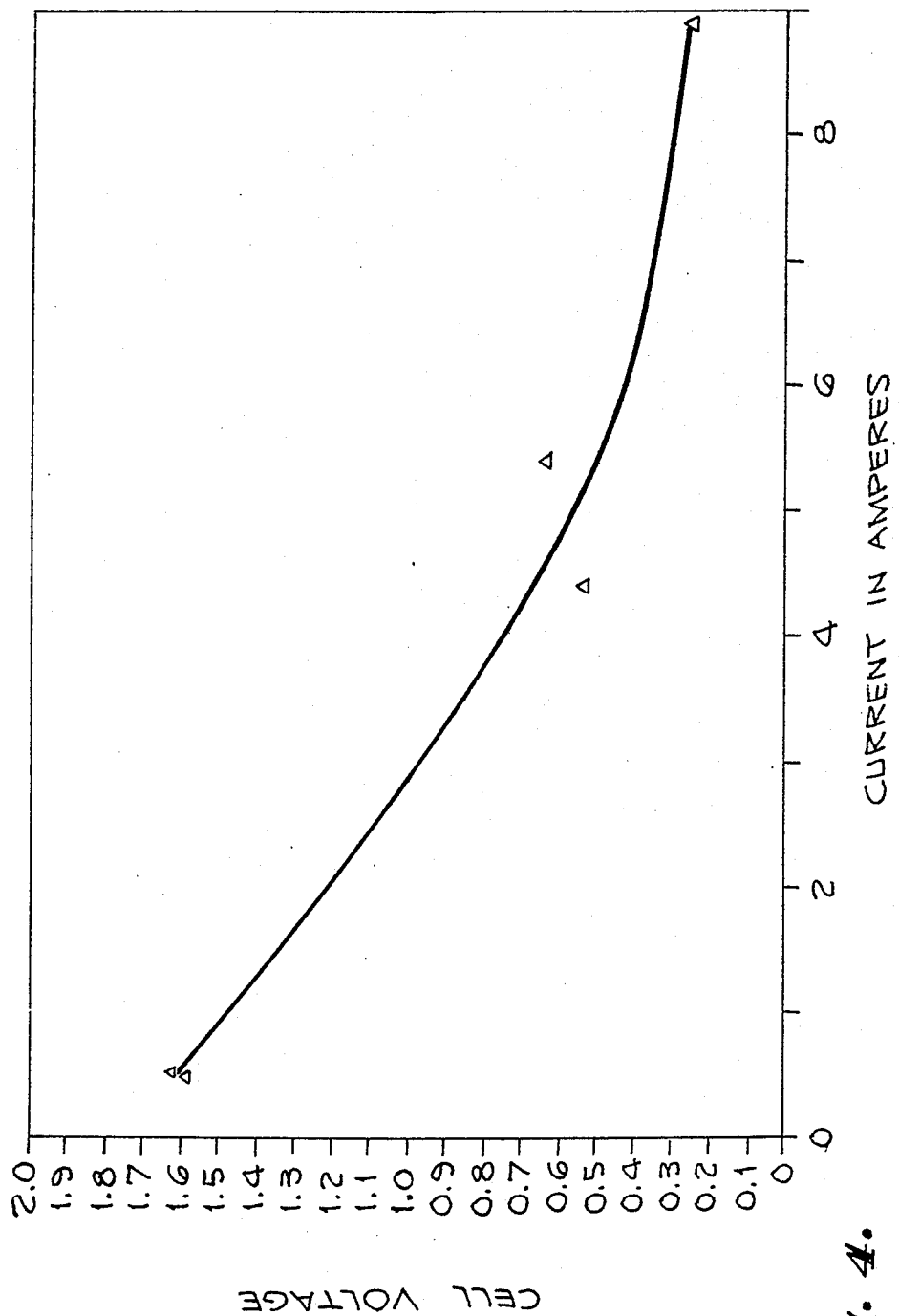
FIG. 4 presents a curve showing current versus voltage behavior at 330° C. for an exemplary sodium-sulfur cell in accordance with the present invention.

FIG. 4 presents a curve indicating the current versus voltage behavior at 330° C. for the sodium-sulfur cell in accordance with the present invention which was constructed as described in Example 4 herein. As indicated in the curve in FIG. 4, an unshorted current density of 1.11 A/cm² was obtained at 0.26 volts; and a maximum power density of 380 milliwatts/cm² is obtained at currents of 0.5 A/cm² and 0.76 volts.

Examples of practice are as follows:

EXAMPLE 1

Miniature cells having 0.38 square centimeters of electrode surface area were prepared as follows. The sulfur electrodes were prepared by compressing graphite felt into the end of a 5 mm Solv-Seal ® flanged glass joint (obtained from Fischer and Porter of Warminster, Pa.) and held in place by a plug of polytetrafluoroethylene containing a small hole. The joint was dipped in molten sulfur and, using a rubber bulb to provide suction, the sulfur was drawn into the graphite. A spiralled platinum wire was placed in the graphite felt and served as a current lead. Upon cooling, the polytetrafluoroethylene plug was removed.

Small disks were punched out of Fibrex ® nickel felt to have a diameter of 0.7 cm. The Fibrex ® was treated electrochemically to reduce the surface oxide. The disks were placed in a glass tube equipped with a glass wool filter at one end and a rubber bulb at the other. Molten sodium was drawn through the glass wool filter into the tube using the rubber bulb to provide suction and allowed to contact the nickel. The assembly was then heated until the disks were fully wetted by the sodium. A second 5 mm Solv-Seal ® joint was used as the electrode holder. A copper wire current lead was spot welded to a metal washer which was mounted in the flange to provide mechanical support and electrical contact. A thermocouple tip was pushed against the washer to facilitate temperature monitoring. The holder was transferred to the glove box, where a disk of sodium-impregnated nickel was inserted. The assembled electrode was then placed in a sealed container and transferred to a second glove box.

The cell was assembled in the second glove box under a nitrogen atmosphere by clamping the sodium and sulfur electrodes together with several layers of porous separator located between them. Adjacent to the sulfur electrode there was one thickness of alumina felt (Zircar APA-2, 0.06 cm thick) followed by a layer of alumina paper (Zircar APA-3, 0.04 cm thick), both impregnated with $Na_2S_3$. Between these and the sodium electrode there was a piece of sintered silica fiber material (Lockheed FRCI-12, 0.20 cm thick). The cell was operated for 90 minutes. During this time performance improved from 190 milliwatts/cm² (mw/cm²) to 490 mw/cm² at 1.4 volts. A maximum current of 1.3 amperes/cm² (A/cm²) was obtained. The cell temperature was held at 405° C.

EXAMPLE 2

A miniature cell of the same size as in Example 1 was prepared in the same way except that no sintered silica fiber was used in the separator. Instead the separator layer sequence from the sulfur side to the sodium side was: Zircar APA-3, two layers, each 0.04 cm thick; Zircar APA-3, three layers filled with $Na_2S_3$, each 0.04 cm thick; Zircar APA-2, 0.06 cm thick. The open circuit voltage (OVC) of the cell was the expected 2.05 volts of a sodium-sulfur battery. The maximum short circuit current was 2.0 A/cm² at 380° C.

EXAMPLE 3

Figure 3:
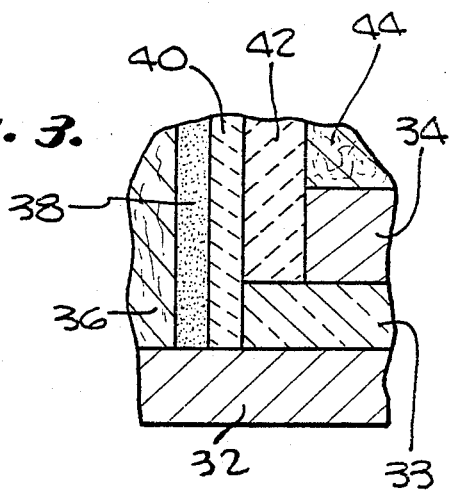
FIG. 3 is a detailed view of a portion of the exemplary sodium-sulfur cell shown in FIG. 2.

A larger cell than in Examples 1 and 2, with 8.0 cm² electrode area was constructed of aluminum and graphite and consisted of a separator sealing arrangement and anode and cathode compartments as detailed in FIGS. 2 and 3. The graphite felt cathode structure 44 and 46 was filled with $Na_2S_3$ instead of sulfur, thereby relegating cell performance to that expected at the end of the cell discharge. The thickness of this cathode structure was about 0.6 cm. The anode nickel Fibrex felt structure 36 was filled, as before, with sodium and was about 0.5 cm thick. On top of this anode structure a sodium-aluminum "clay" 38 in FIG. 2, about 0.15 cm thick was manually pressed onto the surface of the sodium filled Fibrex 36. The "clay" was made by stirring molten sodium into pure aluminum powder (320 mesh) in an aluminum container at 400° C. as described in copending patent application Ser. No. 07/416,685. The proportions were such that the clay mass was free-standing (approximately 30 volume percent sodium). The separator was made of two layers of Lockheed sintered silica HTP-12. Layer 40 was 0.05 cm thick and was manually pressed against the sodium "clay". The other HTP-12 layer 42 was 0.20 cm thick and had been filled with $Na_2S_3$ by placing the disk onto a pool of molten polysulfide in the glove box under nitrogen. Neither of the two layers had been baked out to remove moisture since it was discovered that rigorous drying impedes the wetting of the silica by polysulfides.

The assembled cell was heated in a way that kept the cathode temperature 70° to 80° C. above the anode temperature during cell operation. Because the cell was charged with $Na_2S_3$ instead of sulfur, the maximum OCV was 1.70 volts. The maximum short circuit current density obtained was only 0.19 A/cm².

EXAMPLE 4

The conditions of Example 3 were repeated except for the following changes. Layer 40 in FIGS. 2 and 3 was Zircar APA-2 alumina pretreated with a solution of $Na_2S_4$ in anhydrous ethanol and allowed to dry. This layer was 0.06 cm thick uncompressed but 0.03 cm thick when the cell was in the assembled, compressed state. Layer 40 was manually pressed onto the sodium "clay" 38 after the drying out of the ethanol. Layer 42 consisted of 3 layers of Zircar APA-3 alumina filled with $Na_2S_4$, 0.12 cm thick. Cathode structure 44 was $Na_2S_4$ filled graphite felt and layer 46 was sulfur filled graphite felt. The sodium anode compartment was placed on a hot plate and the top (cathode) side of the cell was separately heated. The performance is detailed in Table I and FIG. 4. An unshorted current density of 1.11 $A/cm^2$ was obtained at 0.26 volts; from the slope of the curve of FIG. 4 it is evident that higher current densities could have been obtained. The data in FIG. 4 indicate that a maximum power density of 380 $mw/cm^2$ is obtained at currents of 0.5 $A/cm^2$ and 0.76 volts.

maintain performance after 50 minutes, and that the cell performance cannot be maintained after 63 minutes.

EXAMPLE 5

The conditions of Example 4 were repeated except for the following changes. Both cathode structures 44 and 46 were impregnated with an equimolar mixture of sulfur and sodium chloroaluminate. Separator layer 40 was Zircar APA-3 treated twice with a saturated solution of $Na_2S_4$ in anhydrous ethanol, 0.04 cm thick. Layer 42 was two layers of APA-3 filled with sodium chloroaluminate, 0.08 cm thick. At 225° C., the cell OCV was 2.4 volts. The best performance which could be obtained was 0.125 $A/cm^2$ at 0.2 volts. In order to obtain this performance the cell pressure was increased by tightening the cell bolts. The cell continued to operate with gradually declining performance for 160 minutes before the heat was turned off. The following day, the cell continued to operate on reheating at the performance level of the previous day As can be seen from the above examples, the use of a porous separator in combination with a polysulfide gradient located therein provides an electrolyte/separator configuration which adequately separates the liquid electrodes in a sodium-sulfur thermal cell while at the same time allowing high ionic conductivity. This com-

TABLE I

| TIME MINS. | CELL TEMPERATURE (°C.) TOP | CELL TEMPERATURE (°C.) BOTTOM | OPEN CIRCUIT VOLTAGE, VOLTS | OPERATING VOLTAGE, VOLTS | CURRENT, AMPERE |
|---|---|---|---|---|---|
| 3 | 85 | 150 | 0.10 | | |
| 5 | | | 0.50 | | |
| 6 | | | 1.77 | | |
| 7 | 221 | 265 | 1.80 | | |
| 9 | | | 1.93 | | |
| 10 | 230 | 262 | 1.96 | | |
| 10 | | | 1.96 | | |
| 16 | 254 | 279 | | 0.02 | 0.90 |
| 19 | | | | 0.06 | 1.00 |
| 22 | | | 1.64 | 1.10 | 0.35 |
| 24 | | | | 1.28 | 0.40 |
| 25 | 260 | 280 | | 1.58 | 0.50 |
| 30 | 306 | 329 | | 1.63 | 0.52 |
| 32 | — | | | 0.26 | 8.90 |
| 33 | 330 | 355 | | 0.64 | 5.40 |
| 34 | | | | 0.54 | 4.40 |
| 34 | | | | 1.60 | 0.50 |
| 42 | | | 1.79 | | |
| 43 | | | | 1.58 | 0.50 |
| 43 | | | | 0.21 | 1.66 |
| 44 | 330 | 355 | | 0.16 | 1.20 |
| 46 | | | | 0.21 | 1.40 |
| 48 | | | | 0.22 | 1.80 |
| 50 | 350 | 425 | | 0.45 | 3.45 |
| 51 | | | | 0.40 | 3.00 |
| 51 | | | | 1.48 | 0.48 |
| 51 | | | 1.48 | | |
| 52 | | | 1.61 | | |
| 53 | | | 1.70 | | |
| 53 | | | | 1.45 | 0.48 |
| 55 | | | | 1.44 | 0.48 |
| 55 | 349 | 430 | | 0.23 | 1.70 |
| 61 | 349 | 430 | | 0.35 | 3.00 |
| 63 | | | | 0.35 | 3.00 |
| 64 | | | | 0.11 | 0.80 |
| 72 | | | | 0.11 | 0.80 |
| 72 | | | 0.32 | | |
| 78 | | | 0.38 | | |
| 78 | | | | 0.03 | 1.10 |
| 79 | | | | 0.03 | 1.10 |
| 80 | | | 0.35 | | |
| 85 | | | 0.35 | | |

The maximum OCV from Table I is 1.96 volts which is consistent with the original mix of $Na_2S_4$ and sulfur. It is also evident that higher temperatures are required to bination of features will be especially useful in those situations where continuous high power output is required over time periods ranging from a few minutes to a number of hours.

The present invention provides a sodium sulfur battery which does not use a ceramic electrolyte and thus overcomes the previously noted prior art problems. The present battery is rugged and is expected to have an indefinite shelf life. Once activated, it must be discharged within several hours, since it will completely self-discharge within approximately six hours, the time depending on the particular battery structural design and temperature. The present invention provides a long shelf-life, rugged, high power density primary battery with discharge times ranging from seconds to several hours depending upon the application requirements and the battery design used to meet those requirements. These applications are presently best met by known thermal batteries such as the $Li/FeS_2$ or $CaCrO_4$ batteries. Possible advantages of this invention over existing thermal batteries would be higher power densities and longer discharge times. The battery of this invention is also rechargeable and can be used as a secondary battery for those applications not requiring long discharge times or charging times. The battery can be readily deactivated by cooling, and then reactivated by heating, unlike some thermal batteries and the state-of-the-art solid electrolyte sodium-sulfur secondary battery. The latter must be carefully cooled and reheated in order to prevent fracture of the solid electrolyte. While the discussion and examples herein are directed toward the use of this invention as a primary thermal battery, experimental evidence does prove the rechargeability and ease of thermal deactivation and reactivation of the battery of the present invention. Thus, the present invention may also be used as a secondary battery.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims

What is claimed is:

1. A sodium-sulfur thermal battery for generating electrical energy at temperatures above the melting point of sodium metal and sulfur, said battery comprising:
   (a) a sodium electrode comprising sodium metal;
   (b) a sulfur electrode comprising sulfur; and
   (c) a separator located between said sodium and sulfur electrodes, said separator having sufficient porosity to allow preliminary migration of fluid sodium metal and fluid sulfur and fluid sodium polysulfides therethrough during operation of said thermal battery to form a mixed polysulfides electrolyte gradient within said separator.

2. A sodium-sulfur thermal battery according to claim 1 wherein said sodium electrode comprises a sodium wettable wick which is impregnated with sodium metal.

3. A sodium-sulfur thermal battery according to claim 2 wherein said sodium wettable wick is made from a metal selected from the group consisting of nickel and steel.

4. A sodium-sulfur thermal battery according to claim 3 wherein said metallic wick comprises nickel felt.

5. A sodium-sulfur thermal battery according to claim 1 wherein said sulfur electrode comprises a sulfur wettable wick impregnated with sulfur.

6. A sodium-sulfur thermal battery according to claim 5 wherein said sulfur wettable wick is made from a material selected from the group consisting of graphite fibers and carbon powders.

7. A sodium-sulfur thermal battery according to claim 6 wherein said sulfur wettable wick comprises graphite felt.

8. A sodium-sulfur thermal battery according to claim 7 wherein said sodium electrode comprises a sodium wettable wick which is impregnated with sodium metal.

9. A sodium-sulfur thermal battery according to claim 8 wherein said sodium wettable wick is nickel felt, said sulfur wettable wick is graphite felt and said separator is a sintered silica fiber mat.

10. A sodium-sulfur thermal battery according to claim 8 wherein said sodium wettable wick is nickel felt, said sulfur wettable wick is graphite felt and said separator is an alumina felt or paper.

11. A sodium-sulfur thermal battery according to claim 1 wherein said separator comprises a porous oxide material.

12. A sodium-sulfur thermal battery according to claim 11 wherein said porous oxide material is selected from the group consisting of silica, alumina and zirconia.

13. A sodium-sulfur thermal battery according to claim 1 wherein said separator is impregnated with a polysulfide electrolyte.

14. A sodium-sulfur thermal battery according to claim 1 wherein said separator is impregnated with sodium chloroaluminate.

15. A sodium-sulfur thermal battery according to claim 1 wherein said separator includes a plurality of layers.

16. A sodium-sulfur thermal battery according to claim 15 wherein the layer of said separator which is closest to said sulfur electrode is impregnated with a polysulfide.

* * * * *